March 10, 1942. R. M. PAGE 2,275,460
ELECTRON BEAM CONTROL APPARATUS
Filed Nov. 1, 1939 2 Sheets-Sheet 1

INVENTOR
ROBERT M. PAGE
BY
ATTORNEY

March 10, 1942.   R. M. PAGE   2,275,460
ELECTRON BEAM CONTROL APPARATUS
Filed Nov. 1, 1939   2 Sheets-Sheet 2

INVENTOR
ROBERT M. PAGE
BY
ATTORNEY

Patented Mar. 10, 1942

2,275,460

UNITED STATES PATENT OFFICE 2,275,460

ELECTRON BEAM CONTROL APPARATUS

Robert M. Page, Washington, D. C.

Application November 1, 1939, Serial No. 302,361

13 Claims. (Cl. 171—95)

(Granted under the act of March 3, 1883, as amended April 30, 1928; 370 O. G. 757)

This invention relates to means for generating step potentials and to apparatus for and methods of operating a cathode ray tube.

Among the numerous objects of this invention are:

To provide a circuit for the generation of incremental voltage steps in one direction terminated by a fast return in the opposite direction;

To provide an aperiodic counter circuit for any scale from two to ten or more utilizing two vacuum tubes;

To provide an aperiodic frequency divider that will produce no output in the absence of an input or controlling voltage;

To provide an integrating circuit that will integrate certain signal conditions and give a running indication of integrated values;

To provide a multiple line sweep circuit in which a single time axis cycle is broken up into equal sections, the sections appearing as spaced parallel lines on a cathode ray screen.

Other numerous and varied objects will become apparent to those skilled in this art upon reading the following description in connection with the accompanying drawings wherein.

The use of the cathode ray oscillograph as a means for indicating a voltage to be studied with respect to the wave form, magnitude and other characteristics of such voltage, is well known. However, owing to limitations imposed upon the area of the cathode ray screen by constructural difficulties, it is impossible with devices of the prior art known to me to obtain an axis of sufficient length for certain purposes without so limiting the scale as to prevent accurate determination of the values involved. The present invention provides a means for greatly increasing the scale of the horizontal axis in the cathode ray tube. The apparatus shown in Fig. 1 has further uses as a counter circuit, frequency divider and integrating circuit.

Figure 1:
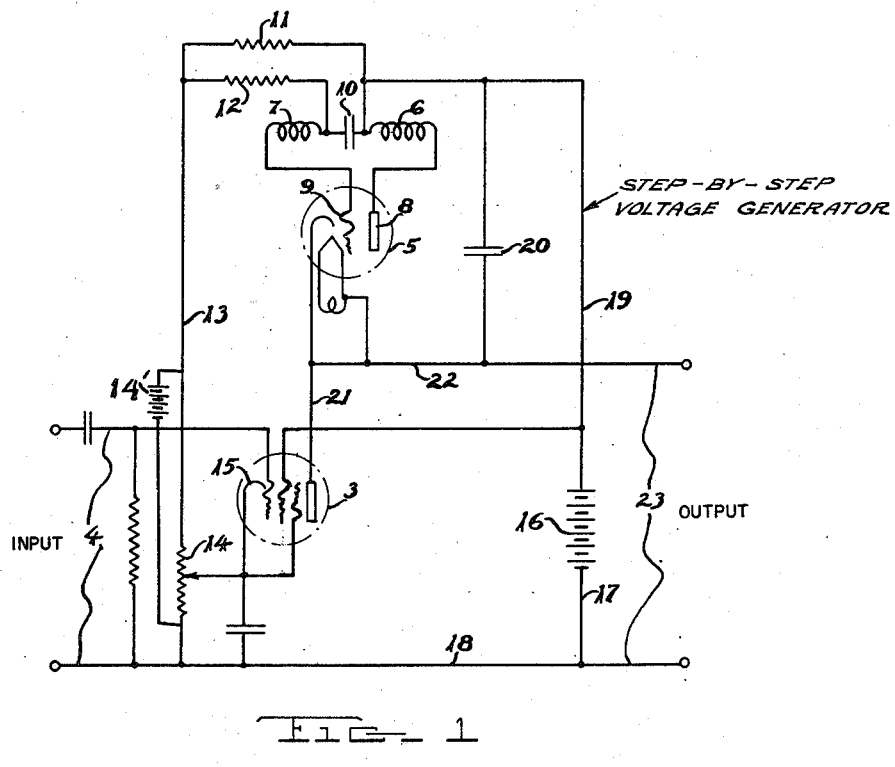
Fig. 1 depicts schematically a circuit for the production of step voltages.

Referring now to Fig. 1, the vacuum tube 3 is preferably a sharp cut off pentode of the type known to the trade as RCA 1851, 1852 or 1853, that is so biased as to be maintained in a non-conducting condition in the absence of signal across input leads 4. While a particular type of tube has been mentioned, it is to be understood that numerous others will operate satisfactorily and efficiently.

Figure 2:
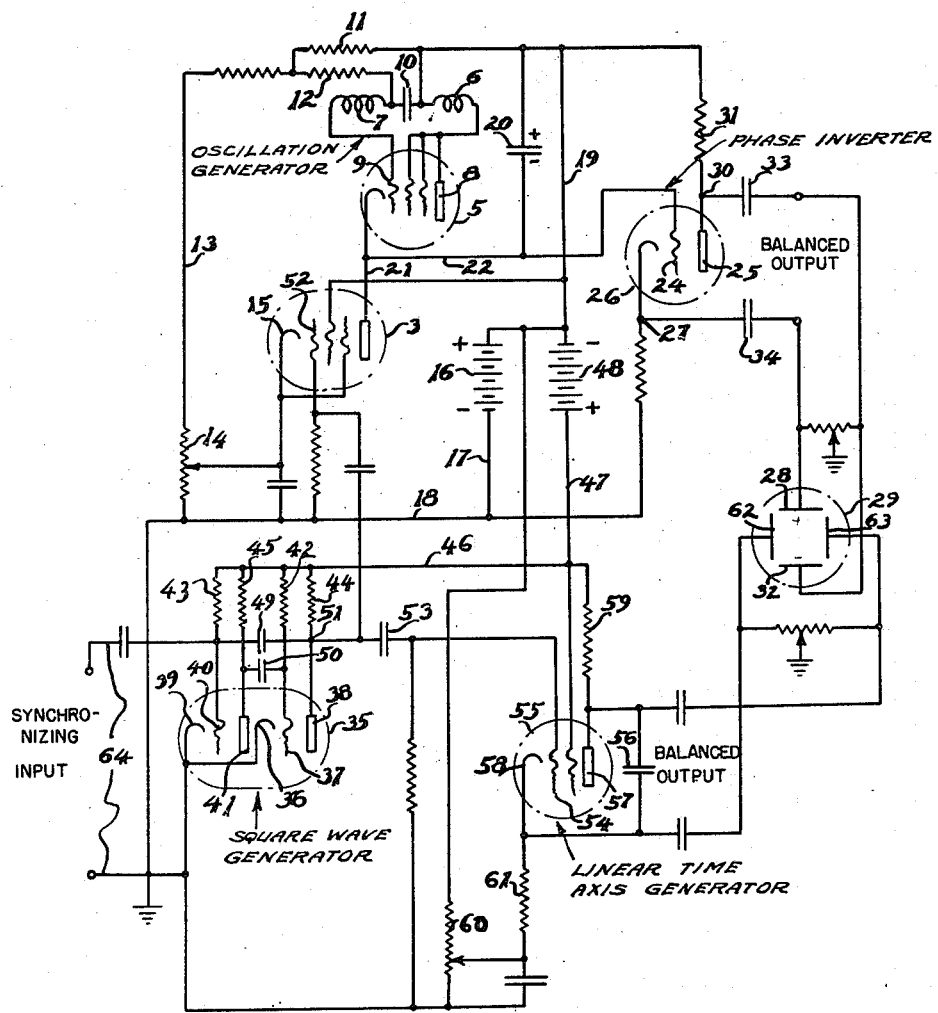
Fig. 2 is a diagram of a circuit utilizing the device shown in Fig. 1 in connection with a cathode ray tube for producing a multiple line time axis.

Tube 5 is shown in Fig. 1 as a triode but it may be a pentode that is triode-connected as exemplified by tube 5 in Fig. 2. The tube 5 should have a high mutual conductance for a purpose that will presently appear. Inductances 6 and 7 are each respectively connected at one side to anode 8 and grid 9 of tube 5 and at their other sides are connected to the terminals of a capacitance 10 whereby an oscillatory circuit, preferably of high frequency, is formed. Resistors 11 and 12 are respectively connected to the anode-connected, and the grid-connected, sides of capacitance 10 and are connected in common by a lead 13 to potentiometer 14 and thereby to cathode 15 of tube 3. Source 16 of current supply is connected by leads 17 and 18 to potentiometer 14 and by lead 19 to inductance 6 and thereby to anode 8. A capacitance 20 is connected in the output circuit of tube 3 through leads 21 and 22 and also through lead 19, resistor 11, lead 13 and potentiometer 14.

It is thus apparent that when tube 3 is rendered conducting by a signal applied through input 4 a certain quantity of electrical energy will be passed through tube 3 and stored in capacitance 20 and if successive signals applied to tube 3 are of substantially equal magnitude and duration, there will be an increase of potential across capacitance 20 that varies by substantially equal steps or changes in value. Tube 5 is biased to be maintained in a non-conducting condition until a predetermined voltage is built up across capacitance 20, when the tube 5 will be rendered conducting and the energy stored in capacitance 20 will be substantially instantaneously dissipated by supplying the energy to the oscillatory circuit connected to anode 8 and grid 9 of tube 5. Any means well known in the art for discharging capacitance 20 when this capacitance has reached a predetermined state of charge may be substituted for tube 5 and the oscillatory circuits connected therewith.

It is obvious that the number of steps by which capacitance 20 is charged may be varied through controlling the increment of energy added at each step and by choice of the potential to which the oscillatory circuit connected to tube 5 will be set into operation to discharge capacitance 20 through tube 5. The output is taken off through leads 23. It is found that capacitance 20 is discharged in less than $10^{-6}$ seconds. The above cycle will then be repeated as long as the signal continues to be applied through input 4.

The apparatus above described may be employed as a counter or as a frequency divider. The input pulses that render tube 3 conducting must be uniform in energy content but may be regularly or irregularly spaced in time. Any desired scale of counting may be had and if the desired unit of counting be designated as X then the circuit parameters should be so chosen that capacitance 20 is charged to the potential required to set tube 5 into operation by the energy supplied by X input pulses. It is obvious that this also effects frequency division on the scale of 1 to X, wherein X is any whole number from 1 to 10 or more. Having any given set of circuit and signal conditions, X may be varied by means of potentiometer 14 which controls the bias on tube 3.

For the purposes of discussion, the incremental voltage steps by which the potential is built up across capacitance 20 are ignored and only the return voltage due to discharge of the capacitance is utilized. This is easily accomplished, since the return voltage is in the opposite direction and of greater amplitude as compared to the steps whereby the potential on capacitance 20 is built up. It is obvious that with a high impedance load circuit, such as the negatively biased grid circuit of a vacuum tube, no output can be obtained in the absence of an input signal.

The device of Fig. 1 may also be used as an integrating circuit. The quantity of energy required to charge capacitance 20 to the point of instability is independent of the form of the charging wave and of the time required to complete the charge. For a given value of capacitance 20 and fixed circuit parameters of tube 5, this quantity of energy is the same for every complete cycle. Given any one set of circuit parameters for tube 3, the time required to complete the charge on capacitance 20 depends wholly on the time integral of energy in the input signal. Therefore the frequency of occurrence of return voltage pulses across the output terminals can be utilized to indicate the time integral of energy in a signal, and ordinarily will be strictly proportional thereto. In this application the circuit is particularly well adapted to indicate the time integral of energy appearing in a signal above a predetermined voltage level, as, for example, the indication of the quantity of power in signal or modulation peaks in excess of a chosen level. This use merely requires that tube 3 be biased beyond cut-off by the value required to prevent conduction in tube 3 for all signal voltages below the desired level of indication.

A very effective use may be made of the apparatus above described when combined with certain other circuits to secure a multiple line axis in a cathode ray tube oscillograph, which will now be described.

The circuit elements shown and described in Fig. 1 are incorporated in Fig. 2 where they are designated by the same reference characters so far as applicable. The potential built up across capacitance 20 is applied between grid 24 and anode 25 of a phase inverter tube 26. The current through tube 26 gives rise to a positive potential at point 27 which is applied to deflector plate 28 while the negative potential at point 30 due to the drop through resistor 31 is applied to deflector plate 32. However, as the potential across capacitance 20 is built up, an increasingly greater negative potential is applied to grid 24 of tube 26 and current through this tube is reduced thereby diminishing the positive potential applied to plate 28 and decreasing the negative potential applied to plate 32, causing the electron beam in cathode ray tube 29 to be shifted in steps corresponding to the steps of potential change across capacitance 20. Capacitances 33 and 34 are provided to give a balanced output from tube 26.

The impulses for rendering tube 3 conducting are derived from a square wave generator of the multivibrator type, as disclosed in my copending application, Serial No. 268,325, filed April 17, 1939. This generator comprises two triode units, shown in Fig. 2 as a twin triode tube 35 having a cathode 36, a grid 37 and an anode 38 in one triode unit and a cathode 39, a grid 40 and an anode 41 in the other triode unit. It will, of course, be understood that the triode units may be in separate tubes. Grids 37 and 40 and anodes 38 and 41 are respectively connected by resistors 42, 43, 44 and 45 to a common lead 46 connected by lead 47 to the positive side of a source 48 of potential. Anode 38 is connected by a capacitance 49 to grid 40 and likewise anode 41 is connected to grid 37 through capacitance 50.

As set forth in detail in my said copending application, applying positive potential to grids 37 and 40 as well as to anodes 38 and 41 greatly increases the frequency range of this type of wave generator and also has a very strong frequency stabilizing effect. As is well known, current passes through the triode units alternately in a wave generator of this type. When current is passing from anode 38 to cathode 36 the positive potential on the anode is decreased but when the current from anode 38 to cathode 36 is suddenly stopped and the current begins to flow from anode 41 to cathode 39, there is a sudden rise in positive potential at point 51 which is applied to grid 52 of tube 3 and causes this tube to pass a quantity of energy, but tube 3 again becomes non-conducting when the passage of current from anode 38 to cathode 36 recommences.

The square waves generated in the unit just described are also applied through capacitance 53 to grid 54 of a tube 55 in a linear time axis circuit such as that forming the subject matter of my copending joint application with Irving H. Page, Serial No. 274,233, filed May 17, 1939. A capacitance 56 is connected between anode 57 of tube 55 and cathode 58 thereof and is also connected through a resistor 59 to positive terminal of source 48 and through resistors 60 and 61 to the negative terminal of source 48, the resistance between capacitance 56 and the respective terminals of source 48 being equal and of such value that capacitance 56 does not acquire more than from 2 percent to 20 percent of the potential of source 48 during the time between pulses applied to grid 54 from the square wave generator and hence the increase in potential across capacitance 56 is substantially linear. However, when a positive pulse is applied to grid 54 the tube becomes conducting and capacitance 56 is substantially instantaneously discharged through tube 55.

The potential built up across capacitance 56 is applied to deflecting plates 62 and 63 of cathode ray tube 29 and it is apparent that the building up of the potential across capacitance 56 and the consequent shifting of the cathode ray beam across the screen corresponds to the time during which one of the potential steps across capacitance 20 endures. Thus, for each new vertical position of the electron beam, the beam is swept horizontally once across the screen and so there is established a multiple line time axis that represents a time equal to one cycle of charging of capacitance 20. The operation of the square wave generator is synchronized with any other phenomenon by a voltage corresponding to such phenomenon applied across the input leads 64.

The invention herein described and claimed may be used and/or manufactured by or for the Government of the United States of America for governmental purposes without the payment of any royalties thereon or therefor.

I claim:

1. A method of operating a cathode ray oscillograph wherein an electron beam is deflectible in two directions at right angles to each other by potential differences applied in said directions, comprising the steps of applying in one said direction a first potential difference while causing said potential difference to vary between two values by substantially equal magnitude of change to shift said beam to different successive parallel planes perpendicular to said direction, and maintaining said beam in each said plane for a predetermined time, and applying in the other said direction a second potential difference that varies continuously and substantially uniformly from a same initial value to a same final value during each said predetermined time.

2. A method of operating a device that includes an indicating instrumentality that is shiftable by potential differences applied thereto, comprising the steps of simultaneously building up and applying to said instrumentality a first potential difference while causing said potential difference to vary, during a predetermined time, from substantially zero to a value not substantially exceeding twenty percent of the potential available to be thus applied to effect linear shifting of said instrumentality parallel to the field of said potential, reducing said first potential difference substantially to zero at the end of each such time, simultaneously applying to said instrumentality a second potential while causing said second potential difference to vary discontinuously through successive substantially equal changes in value, maintaining each said successive value for the duration of one said predetermined time, a said change in value being made simultaneously with each reduction of said first potential difference to zero, each said successive change in value of said second potential shifting said instrumentality at right angles to the shift due to said first potential to a position unique to each said successive value and after a predetermined number of changes in value of said second potential difference substantially instantaneously returning said second potential difference to its initial value simultaneously with a reduction of said first potential difference to zero.

3. A method of operating a cathode ray oscillograph having two pairs of deflecting plates at right angles to each other, comprising the steps of applying to one of said pairs a potential difference that varies discontinuously between two values by substantially equal magnitudes and simultaneously applying to the other said pair a potential difference that varies continuously and substantially linearly between a same initial and a same final value during each period of discontinuity of change of said first-mentioned potential difference.

4. A method of operating a cathode ray oscillograph, comprising the steps of applying to an electron beam therein a first potential that discontinuously varies by substantially uniform differences of value to shift said beam through visibly appreciable distances in one direction, maintaining each such difference of value for a predetermined time, simultaneously applying to said beam a second potential difference varying continuously and substantially linearly from a first value to a second value during each said predetermined time to move said beam at right angles to the movement caused by said first potential, the values between which said second potential varies being the same throughout a cycle of operation as above described and applying a voltage to be indicated to shift said beam in said one direction to produce an indication characteristic of said voltage.

5. Means for producing step potentials, comprising a first vacuum tube having a cathode, a grid and an anode, said tube being maintained in non-conducting condition in the absence of signals, means to apply signals to said tube to render the same conducting; a second vacuum tube having a cathode, a grid and an anode, a high frequency oscillating circuit including two inductances each having a terminal respectively connected to the grid and anode of said second tube, a capacitance connected at its opposite sides to said inductances, two resistances respectively connected to the opposite sides of said capacitance means connecting both of said resistances to the cathode of said first tube, a storage capacitance having one terminal connected to the anode-connected side of the capacitance in said oscillatory circuit and the other side connected to the cathode of said second tube and to the anode of said first tube whereby said storage capacitance is charged with current passed through said first tube, and output means connected across said storage capacitance to apply potentials developed across said storage capacitance.

6. Means for producing step potentials, comprising a first vacuum tube, said tube being maintained non-conducting in the absence of signals, means to apply signals to said tube to render the same intermittently conducting, an output circuit for said tube including a capacitance connected to be charged by current through said tube, a second vacuum tube having a cathode, a grid and an anode, means constituting a high frequency oscillating circuit connecting the grid and anode of said second tube, means connecting the positively charged side of said capacitance to the anode of said second tube and means connecting the negatively charged side of said capacitance to the cathode of said second tube, whereby when said capacitance is charged to a predetermined potential said second tube is caused to oscillate and said capacitance is discharged substantially instantaneously.

7. Means for producing step potentials, comprising a first vacuum tube, said tube being maintained non-conducting in the absence of signals, means to apply signals to said tube to render the same intermittently conducting, an output circuit for said tube including a capacitance connected to be charged by current through said tube, a second vacuum tube having a cathode, a grid and an anode, means constituting an oscillating circuit connecting the grid and anode of said second tube, means connecting the positively charged side of said capacitance to the anode of said second tube and means connecting the negatively charged side of said capacitance to the cathode of said second tube, whereby when said capacitance is charged to a predetermined potential said second tube is caused to oscillate and said capacitance is discharged substantially instantaneously.

8. Apparatus as described, comprising the combination of a square wave generator including two triode units each having cathode, grid and anode, a respective resistance in series with each said grid and each said anode, a common conductor to supply positive potential to which all of said resistances are connected in parallel, capacitive means connecting each said anode to the grid of the other triode unit, means to apply signals to said units to render said units conducting; a linear time axis generator including a vacuum tube maintained non-conducting in the absence of signal, having cathode, grid and anode, a capacitance connected between the cathode and anode of said tube, a source of current, means including a first resistance connecting the positive side of said source to the anode-connected side of said capacitance, means including a second resistance equal in value to said first resistance connecting the negative side of said source to the other side of said capacitance, means connecting said square wave generator to said vacuum tube to apply output energy from said generator to said tube to render said tube conducting and balanced output means connected across said capacitance; a step potential generator comprising a second vacuum tube having cathode, grid and anode, means to impress upon the grid of said second tube an anode potential of said square wave generator, a third vacuum tube of high current carrying capacity having cathode, grid and anode elements, a pair of inductances connected respectively to each of the anode and the grid of said third tube and a second capacitance connecting said inductances to constitute an oscillatory circuit, resistance means connected to each side of said second capacitance and to the cathode of said second tube; a phase inverter tube having cathode, grid and anode, means including a resistance connecting the anode of said third tube to the anode of said phase inverter tube, means connecting the cathode of said third tube to the grid of said phase inverter tube, a third capacitance connected across the cathode and anode of said third tube, and balanced output means connected to the cathode and anode of said phase inverter tube.

9. Apparatus as described, comprising a linear time axis generator including a vacuum tube maintained non-conducting in the absence of signals, having cathode, grid and anode, a first capacitance connected between the cathode and anode of said tube, a source of current, means including a first resistance connecting the positive side of said source to the anode-connected side of said capacitance, means including a second resistance equal in value to said first resistance connecting the negative side of said source to the other side of said capacitance, and balanced output means connected across said capacitance; a step potential generator comprising a second vacuum tube having cathode, grid and anode, a third vacuum tube of high current carrying capacity having cathode, grid and anode elements, a second capacitance connected between the anode and the cathode of said third tube, a pair of inductances connected respectively to each of the anode and the grid of said third tube and a third capacitance connecting said inductances to constitute an oscillatory circuit, resistance means connected to each side of said second capacitance and to the cathode of said second tube; a phase inverter tube having cathode, grid and anode, means including a resistance connecting the anode of said third tube to the anode of said phase inverter tube, means connecting the grid of said phase inverter tube to the cathode of said third tube, and balanced output means connecting the anode and the cathode of said phase inverter tube; and means to supply increments of energy to charge said second capacitance in steps and simultaneously effect the discharge of said first capacitance.

10. Apparatus as described, comprising a linear time axis generator including a vacuum tube maintained non-conducting in the absence of signals, having cathode, grid and anode, a capacitance connected between the cathode and anode of said tube, a source of current, means including a first resistance connecting the positive side of said source to the anode-connected side of said capacitance, means including a second resistance equal in value to said first resistance connecting the negative side of said source to the other side of said capacitance, and balanced output means connected across said capacitance; means to build up a potential by substantially equal steps each of which steps is maintained for a predetermined time and means to cause said linear time axis generator to operate in synchronism with each said voltage step, the duration of each such operation being equal to the time of persistence of each said step.

11. Apparatus as described, comprising a step potential generator comprising a first vacuum tube having cathode, grid and anode, a second vacuum tube of high current carrying capacity having cathode, grid and anode elements, the cathode of said second tube being connected to the anode of said first tube, a pair of inductances connected respectively to each of the anode and the grid of said second tube and a first capacitance connecting said inductances to constitute an oscillatory circuit, resistance means connected to each side of said first capacitance and to the cathode of said first tube; a phase inverter tube having cathode, grid and anode, means including a resistance connecting the anode of said second tube to the anode of said phase inverter tube, means connecting the cathode of said second tube to the grid of said phase inverter tube, a third capacitance connected across the cathode and anode of said second tube, means to produce a substantially linear voltage change and means controlling passage of current through said first tube to synchronize the output of said step generator with said linear voltage change whereby said linear voltage passes through one cycle during the persistence of each step of output of said step generator.

12. Apparatus as described, comprising a square wave generator including a first vacuum tube having cathode, grid and anode; a step potential generator comprising a second vacuum tube having cathode, grid and anode, means to impress upon the grid of said second tube an anode potential of said square wave generator, a third vacuum tube of high current carrying capacity having cathode, grid and anode elements, a pair of inductances connected respectively to each of the anode and the grid of said third tube and a second capacitance connecting said inductances to constitute an oscillatory circuit, resistance means connected to each side of said second capacitance and to the cathode of said second tube; means to produce a substantially linear voltage change and means connecting said square wave generator to said linear voltage means to synchronize the output of said step generator with said linear voltage change whereby said linear voltage change passes through one cycle during the persistence of each step of output of said step generator.

13. Apparatus as described, comprising means for generating step voltages, phase inverting means connected to be controlled by said step generator means, means for generating a substantially linear time axis voltage, and means to synchronize said time axis voltage with the output of said phase inverter whereby said linear time axis voltage passes through one cycle during the persistence of each step of output of said phase inverter.

ROBERT M. PAGE.